(12) United States Patent
Guionneau

(10) Patent No.: US 11,665,162 B2
(45) Date of Patent: May 30, 2023

(54) METHOD FOR AUTHENTICATING A USER WITH AN AUTHENTICATION SERVER

(71) Applicant: EVIDIAN, Les Clayes-sous-Bois (FR)

(72) Inventor: Christophe Guionneau, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 259 days.

(21) Appl. No.: 16/640,567

(22) PCT Filed: Aug. 22, 2018

(86) PCT No.: PCT/EP2018/072659
§ 371 (c)(1),
(2) Date: May 8, 2020

(87) PCT Pub. No.: WO2019/038323
PCT Pub. Date: Feb. 28, 2019

(65) Prior Publication Data
US 2020/0274873 A1    Aug. 27, 2020

(30) Foreign Application Priority Data
Aug. 22, 2017 (FR) ...................... 1757803

(51) Int. Cl.
*H04L 9/40* (2022.01)
*H04L 9/32* (2006.01)
*H04L 9/14* (2006.01)
*H04L 9/30* (2006.01)

(52) U.S. Cl.
CPC ............ *H04L 63/0884* (2013.01); *H04L 9/14* (2013.01); *H04L 9/30* (2013.01); *H04L 9/3213* (2013.01); *H04L 9/3271* (2013.01)

(58) Field of Classification Search
CPC ........ H04L 63/0884; H04L 9/14; H04L 9/30; H04L 9/3213; H04L 9/3271; H04L 63/0892
See application file for complete search history.

(56) References Cited

U.S. PATENT DOCUMENTS

| 10,270,774 | B1 * | 4/2019 | Berman | ................ H04W 12/06 |
| 10,929,572 | B2 * | 2/2021 | Wu | ........................ H04L 9/0897 |
| 2011/0067095 | A1 * | 3/2011 | Leicher | ................... H04L 63/12 726/10 |

(Continued)

OTHER PUBLICATIONS

International Search Report as issued in International Patent Application No. PCT/EP2018/072659, dated Sep. 14, 2018.

(Continued)

*Primary Examiner* — Linglan Edwards
*Assistant Examiner* — Vy H Ho
(74) *Attorney, Agent, or Firm* — Arc IP Law, PC; Joseph J. Mayo

(57) ABSTRACT

A method performs a strong authentication using a mobile terminal and the capability of the user, as proof of an identity. The mobile terminal allows an authentication to be established by communicating with a proxy authentication server and a notification server. These communications are initiated by an authentication server, used for the authentication. Throughout the authentication, the authentication server remains masked by the proxy authentication server. The only interface between the authentication server and the rest of the world is the proxy authentication server.

3 Claims, 3 Drawing Sheets

(56) References Cited

U.S. PATENT DOCUMENTS

| | | | |
|---|---|---|---|
| 2011/0219427 A1* | 9/2011 | Hito | H04L 63/0853 |
| | | | 726/3 |
| 2013/0046976 A1* | 2/2013 | Rosati | H04W 12/03 |
| | | | 713/168 |
| 2014/0096220 A1* | 4/2014 | Da Cruz Pinto | G06F 21/00 |
| | | | 726/9 |
| 2015/0304110 A1* | 10/2015 | Oberheide | H04L 63/0823 |
| | | | 713/155 |
| 2017/0111170 A1 | 4/2017 | Baghdasaryan | |
| 2018/0041467 A1* | 2/2018 | Vats | H04L 9/0891 |
| 2018/0063564 A1* | 3/2018 | Phatak | H04N 21/4753 |
| 2018/0324173 A1* | 11/2018 | Ananthapur Bache | |
| | | | H04L 63/0815 |
| 2018/0343246 A1* | 11/2018 | Benayed | H04L 9/3226 |

OTHER PUBLICATIONS

Search report issued in FR1757803, dated Jun. 5, 2018 (11 pages).

* cited by examiner

METHOD FOR AUTHENTICATING A USER WITH AN AUTHENTICATION SERVER

TECHNICAL FIELD OF THE INVENTION

The object of the invention is a method for authenticating a user with an authentication server.

The field of the invention is that of authentication.

More precisely, the field of the invention is authentication for web applications or application portals.

These applications and portals require authentication mechanisms that are both robust and simple to use to suit different population of users. These populations are either the employees of companies or clients thereof. Certain operations, through these applications, require a high level of authentication, such as for example applications enabling bank transactions.

The authentication mechanisms must be sufficiently robust to certify that the authenticated user is not a misused identity.

The authentication mechanisms must be sufficiently simple to use so as not to disconcert users.

PRIOR ART

The document US patent 2017/111170 A1 is notably known from the prior art.

Conventional authentication mechanisms are based on "login" identifiers and passwords. The weakness of the use of passwords no longer needs to be demonstrated. New multi-factor type authentication mechanisms are used to reinforce conventional authentication mechanisms. The principle of multi-factor authentication is based on the principle "what I know AND what I have". The possessed object makes it possible to add an authentication factor, for example a USB key containing a secret or a mechanism of encryption by private key, a key or an application generating OTPs (One Time Passwords) synchronized with a server, etc.

Other multi-factor principles use the mobile telephone of the user to receive an authentication code, by email, by SMS or by push notification, etc. The use of the mobile telephone offers several advantages:

The user keeps his telephone with him permanently. It is easier to forget or lose a USB key than his telephone.
Telephones are always charged (hardware tokens pose problems of change of battery).
Telephones have sufficient processing power to perform complex encryption operations.
Telephones have access to 3G or Wi-Fi networks, and to the Internet.

However, the sending of SMS is not considered secure because they go through the infrastructure of telephone operators.

Similarly, the sending of emails poses problems of delivery times, and cannot be used for protecting access to an email messaging service.

Further, the mechanisms for sending notifications depend on the infrastructures of the manufacturers of mobile telephones. These infrastructures propose their own mechanisms for securing communications and identifications of telephones, but all of the data transits via an uncontrolled third party infrastructure.

These notification infrastructures, even if they propose a reduced, or even zero, cost, and data transfer mechanisms between the servers and the telephones, can only be used as authentication mechanism by implementing independent securement mechanisms.

Authentication mechanisms by notifications use third party notification infrastructures in the following manner:

By sending, in the charge of the notification, a single-use authentication password, as in mechanisms by SMS;
Or by sending, in the charge of the notification, sets of encrypted tokens, that only the enrolled telephone can decrypt;
Or by sending, in the notification, the URL of the server requesting the authentication and which serves as access point for recovering the data of the OTP authentication;
And by requesting the user to approve the notification and thus the authentication by validation of a form setting out the data of the authentication request;
And by connecting to the access point of the server that is the sender of the request, to send back the response to the authentication request in the form of an OTP, over-encrypted or decrypted with the known secrets of the enrolled telephone.

The technical problems of the preceding methods are linked to the difficulty of constructing an authentication principle, independent of the notification infrastructure, security vulnerabilities inherent in the telephones themselves, and in the securement of communications between the numerous servers requesting authentications and the telephones.

The notification infrastructure cannot be considered as secure because it depends on a third party.

The identifications of the telephones in the notification infrastructures may vary as a function of uncontrolled parameters.

The notification infrastructures are not necessarily homogeneous between different providers. Their characteristics may also change over time; renewal of access keys for the authentication servers, evolution of protocols.

In the course of the technical evolution of the notification infrastructure, or the technical evolution of the application which receives the notifications, the API keys used or the identifications may change at the initiative of the provider of the notification infrastructure. If the API keys are used by several servers of several clients, it is necessary to redeploy a new version containing the new API keys. These API keys must be conserved in a secure manner because they are linked to the mobile application receiving the notifications, the loss of its keys may lead to endangering the authentication mechanisms of all the users of the mobile application and all the clients of the service.

Telephones are not considered as secure because they can be stolen or used to the detriment of the legitimate user.

Mobile applications are poorly secured; by the use of system certificates which may be corrupted, by copying data or cloning of the application on another telephone, etc.

The communication infrastructure between telephones and authentication servers is not considered as secure because it can pass via uncontrolled 3G or Wi-Fi connections. In addition, direct connections between mobile telephones and authentication servers internal to the network of the company are often impossible or a source of vulnerability in the network of the company.

Pooled services dedicated to the authentication of users thanks to their mobile telephone exist. They can be used thanks to APIs (WebService or REST) or identity federation protocols such as OpenIDConnect or SAML. But these services need to know the identity of the users and have to manage and store the secrets exchanged with the telephones. The users are thus declared and known to a service external to the company. These services thus pose a problem of confidentiality and responsibility in the management of users. It is possible for example to cite MobileConnect, which is managed by telephone operators. The operator of this service knows the users by name, possesses a large amount of meta-data on said user, as well as the whole of his authentication history. The technical problems that it is sought to resolve are thus:

- Authenticating a user thanks to his mobile telephone by sending him a notification only requiring a very simple but secure interaction to validate the authentication;
- Using mechanisms for sending notifications of providers of telephones in a secure manner;
- Providing a mechanism that is free of the network and security constraints of companies, only using outgoing connections;
- Providing a pooled service for several clients, while guaranteeing that the authentications of the users of each client are processed in a partitioned manner. Perfect impermeability is required between the authentication data of each client, the enrollment keys of the telephones of the users are not shared between the clients;
- Providing a pooled authentication service which does not possess any information on the users that use it. The management of the user and the keys associated with his telephone is managed by the client company of the service;
- Transmitting, from an authentication server which may be internal to the network of the company, an OTP that only the recipient mobile telephone can decrypt;
- Transmitting, from the mobile telephone of the user, the decrypted OTP serving as proof of identity, to the authentication server which may be internal to the network of the company;
- Receiving, on the authentication server of the company, proof of authentication of the user.

DESCRIPTION OF THE INVENTION

The invention resolves these problems by implementing a proxy authentication server which schedules the communications between a calculator, an authentication server and a notification server.

Communications between the different devices are secured by the use of encryption techniques, for example SSL, TLS, or equivalent.

The object of the invention is thus a method for authenticating a user with an authentication server, characterized in that the authentication server comprises:
- A memory zone for storing a registration associating:
  - An identifier of the user on the authentication server;
  - An identifier of the user on a proxy authentication server;
  - A public key of a dual key;

the method making it possible to authenticate the user having at his disposal a calculator comprising:
- A memory zone for storing the private key of the dual key;
- A memory zone for storing an identifier of the user on a notification server;
- A memory zone for storing an identifier of the user on the proxy authentication server;

the authentication taking place through the proxy authentication server comprising:
- A memory zone for storing a registration associating:
  - The identifier of the user on the proxy authentication server;
  - The identifier of the user on the notification server, the method comprising the following steps:
- Production, by the authentication server, of a challenging message comprising:
  - A random variable encrypted with the public key
  - The identifier of the user on the proxy authentication server
- Sending the challenging message, by the authentication server, to the notification server, the authentication server receives in response a challenge token;
- Production, by the proxy authentication server upon receipt of a challenging message:
  - Of a challenge token associated with the challenging message;
  - Of a notification message comprising:
    - The identifier of the user on the notification server;
    - A notification token, produced by the proxy authentication server, the notification token being associated, on the proxy authentication server, with the challenging message;
- Sending the notification message, by the proxy authentication server, to the notification server;
- Delivery of the notification message by the notification server;
- Production by the calculator, upon receipt of the notification message, of a challenge accepted message, the challenge accepted message comprising:
  - The identifier of the user on the proxy authentication server;
  - The identifier of the user on the notification server;
  - The notification token;
- Sending, by the calculator, the challenge accepted message to the proxy authentication server;
- Production, by the proxy authentication server upon receipt of the challenge accepted message, of a challenge message comprising:
  - The encrypted random variable found thanks to the content of the challenge accepted message;
- Sending, by the proxy authentication server, the challenge message to the calculator;
- Production, by the calculator upon receipt of the challenge message, of a response message comprising:
  - The result of the decryption of the random variable encrypted by the use of the private key;
- Sending, by the calculator, the response message to the proxy authentication server;
- Association, by the proxy authentication server upon receipt of the response message, of the result of the decryption and the challenge token;
- Interrogation, by the authentication server, of the proxy authentication server to obtain the content of the response message associated with the challenge token;
- Comparison, by the authentication server, of the content of the response message with the random variable produced to determine the result of the authentication.

Advantageously, the invention may also be combined with the following characteristics: the dual key, the user identifier on the proxy server, the user identifier on the notification server are produced in the course of an enrollment of the calculator, said enrollment taking place as follows, the user having at his disposal the calculator and a secure terminal connected to the authentication server:
- The user registers himself, with the calculator, on the notification server and obtains the user identifier on the notification server;

The user uses the secure terminal to authenticate himself and to send an enrollment request message to the authentication server;
Production, by the authentication server upon receipt of an enrollment request message, of the following elements:
A dual key associated with the user;
An enrollment initiation message sent to the proxy authentication server;
Implementation, by the proxy authentication server upon receipt of an enrollment initiation message, of the following actions:
Creation of a registration associating:
A user identifier on the proxy server;
An enrollment token;
Production of an initiated enrollment message comprising:
The user identifier on the proxy server;
The enrollment token;
Sending the initiated enrollment message in response to the enrollment initiation message;
Implementation, by the authentication server upon receipt (3080) of an enrollment initiation message, of the following actions:
Production of an enrollment acceptance message comprising:
At least the private key of the dual key;
The enrollment token;
Sending the enrollment acceptance message in response to the enrollment request message;
Implementation by the secure terminal upon receipt of an enrollment acceptance message:
Displaying, on a screen of the secure terminal, the content of the message received;
Acquisition, by the calculator, of data displayed on the screen of the secure terminal;
Implementation, by the calculator following the acquisition of the data, of the following actions:
Creation of a registration associating:
At least the private key of the dual key
The identifier of the user on the notification server
Production of an enrollment finalization message comprising
The enrollment token;
The identifier on the notification server;
Sending the enrollment finalization message to the proxy authentication server;
Implementation, by the proxy server following the receipt of an enrollment finalization message, of the following actions:
If a registration corresponds to the enrollment token of the finalization message then:
Association of the identifier on the notification server with the corresponding registration;
Production of a finalized enrollment message comprising:
The identifier on the proxy authentication server of the corresponding registration;
Sending the finalized enrollment message in response to the message of finalization of registration;
Sending an enrollment confirmation message to the authentication server;
Deletion of the enrollment token;
Implementation, by the calculator upon receipt of a finalized enrollment message, of the following actions:
Association with the registration corresponding to the message of finalization of registration of the identifier on the proxy server.

Advantageously, the invention may also be combined with the following characteristics: access to memory zones of the calculator is locked by a security mechanism local to the calculator.

The invention will be better understood on reading the description that follows and by examining the figures that accompany it. These figures are presented as an example that is no way limiting. In the different figures, identical references refer to identical elements. This may be the same element or elements having the same functions.

BRIEF DESCRIPTION OF THE FIGURES

The figures show.

Detailed Description of an Embodiment

Figure 1:
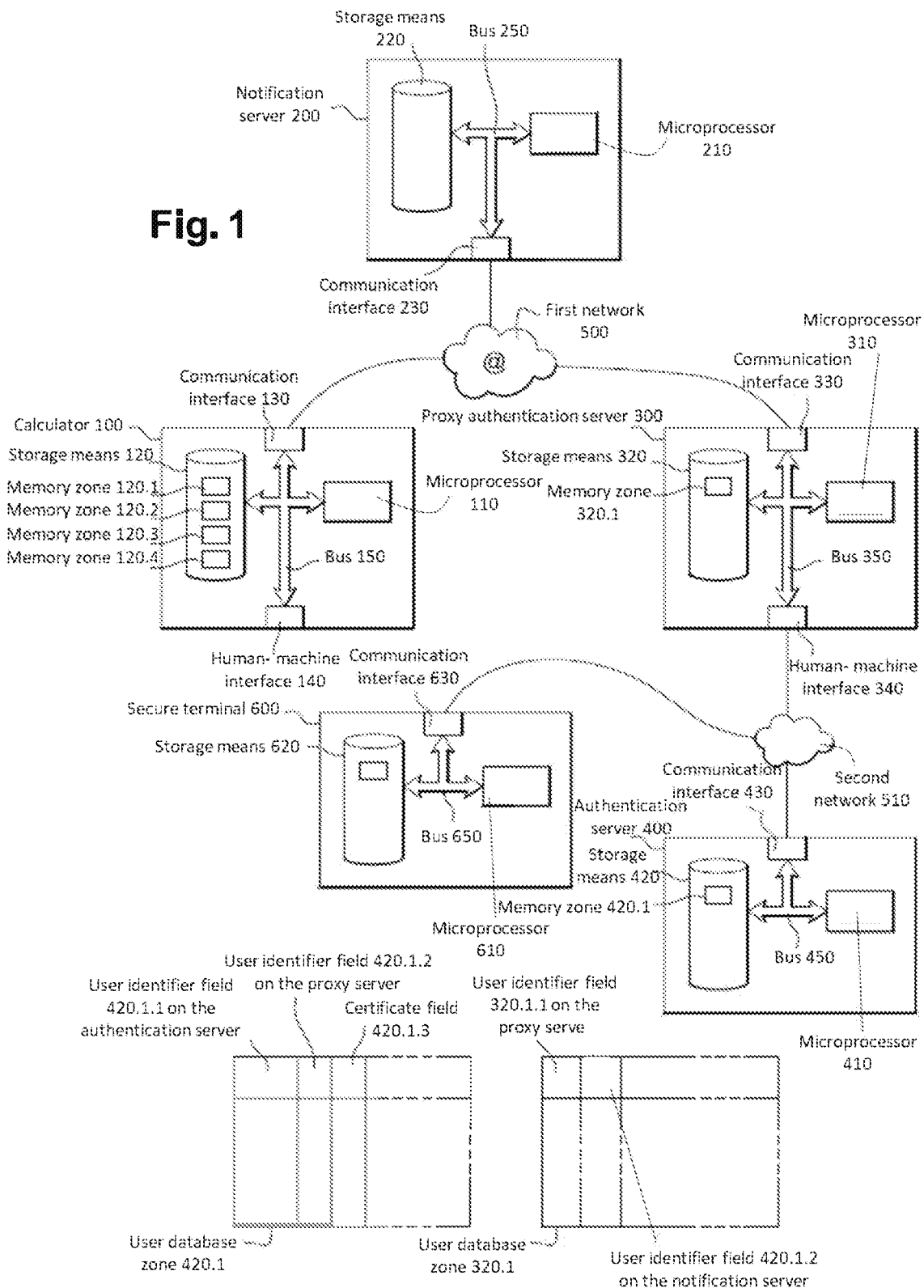
FIG. 1, an illustration of means enabling the implementation of the invention.

FIG. 1 shows a calculator 100. FIG. 1 shows that the calculator 100 comprises:
A microprocessor 110;
Storage means 120, for example a hard disc, a memory card, an integrated component, or a part of an integrated component dedicated to data storage;
A communication interface 130;
Human-machine interface means 140, for example a touch screen. These human-machine interface means 140 may also comprise a camera.
The calculator is for example a mobile smartphone. In practice, a calculator is any device able to implement an application using a notification service. A notification service is, for example, Firebase Cloud Messaging (formerly Google Cloud Messaging), Apple Push Notification Service, or SignalR. Functionally, the use of a notification service allows the calculator to receive messages in "push" mode.

The microprocessor 110 of the calculator, the storage means 120 of the calculator, the communication interface 130 of the calculator and the human-machine interface means 140 of the calculator are interconnected by a bus 150.

Generally speaking, the storage means may be local or accessible remotely.

FIG. 1 shows a notification server 200. A notification server enables the implementation of a notification service of the type of those already cited. In practice, a notification service is implemented by a more complex architecture, but it remains assimilable to a server.

Conventionally, a notification server knows the users that it identifies by a user identifier on the notification servers. A notification server receives messages comprising at least one recipient identifier and a content. The notification server pushes the messages that it receives to the identified recipients. Conventionally, a message managed by a notification server also comprises a sender identifier which allows the identified recipients of the messages to process the messages.

FIG. 1 shows that the notification server 200 comprises:
A microprocessor 210;
Storage means 220;
A communication interface 230;

The microprocessor 210 of the notification server 200, the storage means 220 of the notification server 200, the communication interface 230 of the notification server 200 are interconnected by a bus 250.

FIG. 1 shows a proxy authentication server 300. The proxy server 300 enables strong isolation of an authentication server 400 of an organization. Thanks to the proxy authentication server 300 it is not connected directly to a public network and thus cannot be attacked easily.

FIG. 1 shows that the proxy authentication server 300 comprises:
A microprocessor 310;
Storage means 320;
A first communication interface 330;
A second communication interface 340;

The microprocessor 310 of the proxy authentication server 300, the storage means 220 of the proxy authentication server 300, the first communication interface 330 of the proxy authentication server 300 and the second communication interface 340 of the proxy authentication server 300 are interconnected by a bus 350.

FIG. 1 shows an authentication server 400. FIG. 1 shows that the authentication server 400 comprises:
A microprocessor 410;
Storage means 420;
A communication interface 430;

The microprocessor 410 of the authentication server 400, the storage means 420 of the authentication server 400 and the communication interface 430 of the authentication server 400 are interconnected by a bus 450.

FIG. 1 shows that the communication interface of the calculator 100, the communication interface of the notification server 200 and the first communication interface of the proxy authentication server 300 are connected to a first network 500. In the invention, the first network 500 is a public network, or open network, for example the Internet network.

FIG. 1 shows that the second communication interface of the proxy server 300 and the communication interface of the authentication server 400 are connected to a second network 510. The second network 510 is a private network as opposed to the first public network 500.

FIG. 1 shows that the storage means of the authentication server comprise several zones. In particular, for the invention, the storage means 420 of the authentication server comprise:
A zone, not represented, for registering instruction codes for the implementation of the method according to the invention;
A user database zone 420.1. This user database is configured to make it possible to store user registrations of the authentication server. A user registration of the authentication server comprises a plurality of fields of which at least:
A user identifier field 420.1.1 on the authentication server;
A user identifier field 420.1.2 on the proxy authentication server and
A certificate field 420.1.3 comprising a dual key.
A registration is an association of fields.

In this description, the term database is employed in the wide sense. It may be one or more flat files of CSV file type, one or more hierarchical files of XML or JSON type, a rational database of SQL type or a NoSQL database system. This enumeration is not exhaustive.

FIG. 1 shows that the storage means of the calculator comprise several zones. In particular, for the invention, the storage means 120 of the calculator 100 comprise:
A zone not represented for registering instruction codes for the implementation of the method according to the invention;
A memory zone 120.1 for registering a private key of a dual key;
A memory zone 120.2 for registering a user identifier on the notification server 200;
A memory zone 120.3 for registering an identifier of the user on the proxy authentication server 300;
A memory zone 120.4 for registering an address of the proxy authentication server.

In one implementation of the invention, wherein a user of the calculator 100 could have need of several identities. The memory zone for registering a private key of a dual key, the memory zone for registering a user identifier on the notification server 200 and the memory zone for registering an identifier of the user on the proxy authentication server 300 are associated in an identification registration. In this case, the calculator is configured to be able to register several identification registrations.

FIG. 1 shows that the storage means of the proxy authentication server comprise several zones. In particular, for the invention, the storage means of the proxy authentication server comprise:
A zone, not represented, for registering instruction codes for the implementation of the method according to the invention;
A user database zone 320.1. This user database is configured to make it possible to store user registrations of the proxy authentication server. A user registration of the proxy authentication server comprises a plurality of fields of which at least:
A field 320.1.1 identifying the user on the proxy authentication server;
A field 320.1.2 identifying the user on the notification server.

When an action is ascribed to a device it is in fact carried out by a microprocessor of the device controlled by instruction codes registered in a memory of the device. If an action is ascribed to an application, it is in fact carried out by a microprocessor of the device in a memory in which instruction codes corresponding to the application are registered. When a device, or an application, sends a message, this message is sent via a communication interface of said device or said application. In these cases, a device is real or virtual. In practice, a message comprises at least data making it possible to identify sender and recipient.

Figure 2:
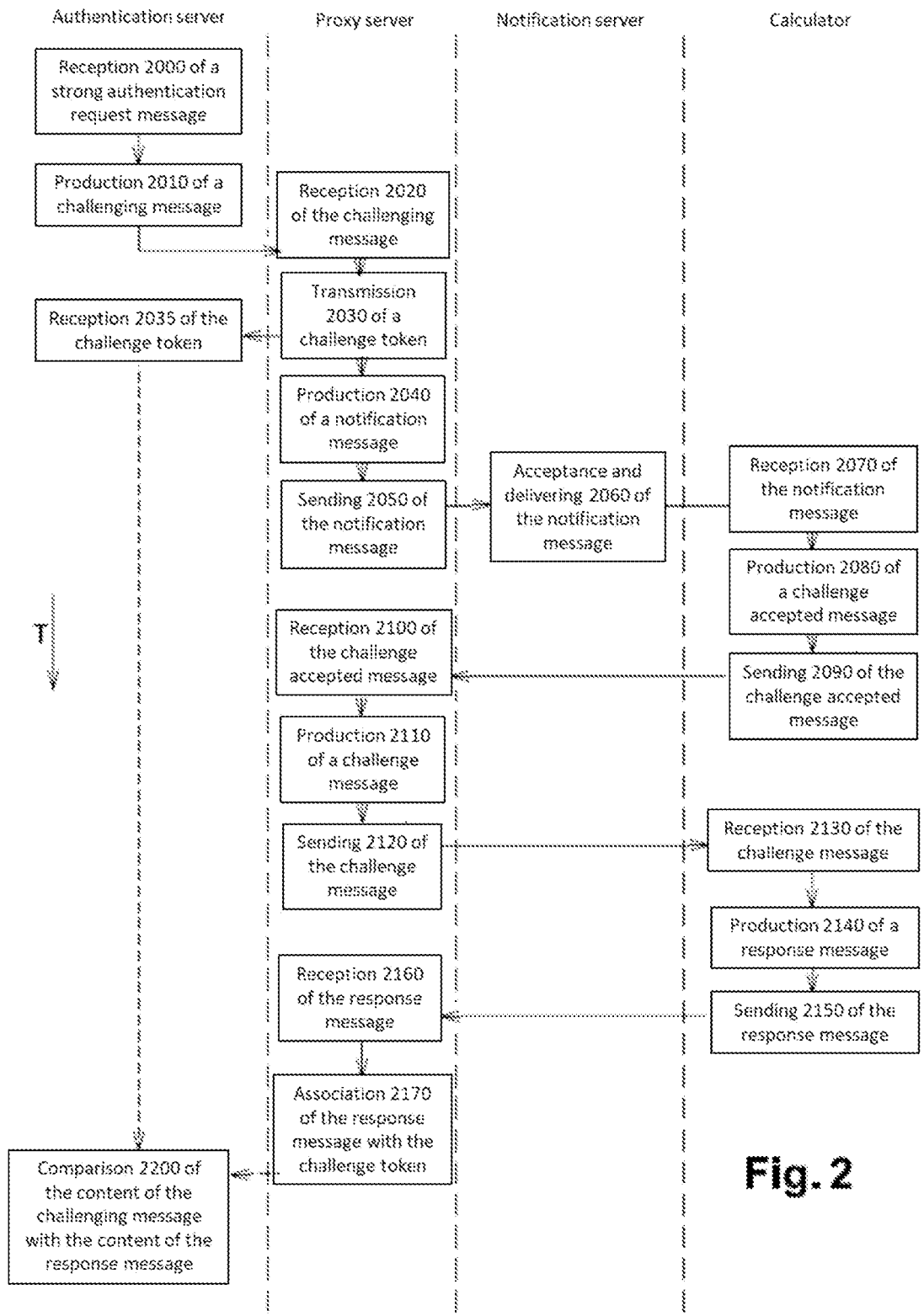
FIG. 2, an essentially chronological illustration of steps of the authentication method, the steps being represented distributed by actor.

FIG. 2 illustrates the steps of the method according to the invention for strong authentication of a user. In the invention, strong authentication is done by obtaining proof of possession and control of the calculator described previously.

FIG. 2 shows a preliminary step 2000 wherein the authentication server receives a strong authentication request message from a user. Such a message comprises at least:

A code instruction;

An identification datum of the user to authenticate.

The code instruction allows the authentication server to determine what processing to apply to the message received. This code is optional if it can be deduced from the receipt context. The receipt context is, for example, the channel through which the message has been received, this channel being dedicated upon receipt of such a message. Another example of context may also be the rank of the message in a message sequence. Hereafter, it is no longer specified that the messages comprise a code instruction corresponding to their name. It is implicit that a mechanism enabling the recipient of the message to determine the nature of the message is used.

An identification datum of the user to authenticate is a datum which enables the authentication server to find in the user database of the authentication server the registration that corresponds to the user to authenticate. Such an identification datum is thus either a user identifier on the authentication server, or a datum associated with a user identifier on the authentication server. Such a datum is, for example, an email for example: "u@auth.tld".

Once the user registration has been found, the authentication server passes to a step 2010 of production of a challenging message. In step 2010, the authentication server implements the following actions:

It generates a random number and encrypts it with the public key of the user registration certificate found;

It produces a message comprising:
The encrypted random number;
The user identifier on the proxy authentication server, this identifier being read in the registration found.

It sends the challenging message to the proxy authentication server.

In an alternative of the invention, the communications between the authentication server and the proxy authentication server are encrypted, for example by use of the SSL protocol, and/or subjected to the use of a password or of a connection token. The same applies for all the communications described, in particular those carried out via a network public.

In an alternative of the invention, the user identifiers on the authentication server and on the proxy authentication server are the same.

In a step 2020, the proxy authentication server receives the challenging message produced by the authentication server. In this step, the proxy authentication server uses the content of the message to find a registration in the user database of the proxy authentication server. The registration found is a proxy user registration.

The proxy authentication server then passes to a step 2030 of a challenge token that it associates with the challenging message received. This challenge token is transmitted to the authentication server in response to the challenging message.

In a step 2035, the authentication server receives a challenge token in response to the challenging message sent. From this receipt, the authentication server uses this challenge token to request, at regular intervals, the result of the challenge to the proxy authentication server.

The proxy authentication server then passes to a step 2040 of production of a notification message, the notification message comprising:

The identifier of the user on the notification server, this identifier being read in the proxy user registration found;

A notification token produced for the circumstance and associated with the challenging message received;

Once the notification message has been produced, the proxy authentication server passes to a step 2050 of sending the notification message to the notification server.

In a delivery step 2060, the notification server accepts the notification message and delivers it to the calculator.

In a step 2070, the calculator receives the notification message delivered during the delivery step.

From the step of receipt of a notification message, the calculator passes to a step 2080 of production of a challenge accepted message. A challenge accepted message comprises the following fields:

Identifier of the user on the proxy authentication server, read in the storage means of the calculator;

Identifier of the user on the notification server;

The notification token, read in the notification message received.

In a step 2090 of sending a challenge accepted message, the calculator sends the challenge accepted message produced directly to the proxy authentication server.

In a step 2100, the proxy authentication server receives the challenge accepted message. In this step, the proxy authentication server uses the content of the challenge accepted message to find the corresponding challenging message. This corresponding message was associated with the notification token contained in the challenge accepted message. The proxy authentication server then passes to a step 2110 of production of a challenge message.

It may be noted that, in a preferred alternative of the invention, the proxy authentication server verifies all the data of the challenge accepted message. It verifies in particular if the user identifier on the proxy authentication server indeed corresponds to that expected. This datum not having been sent, only the targeted user can know it. The use of this datum thus reinforces the authentication. If this verification fails, the authentication process stops.

The challenge message produced comprises at least:

The notification token;

The encrypted random variable received via the challenging message.

Once the challenge message has been produced, the proxy authentication server passes to a step 2120 of sending the challenge message directly to the calculator. In a step 2130 of receipt of a challenge message, the calculator receives the challenge message produced.

In a step 2140 of production of a response message, the calculator uses the content of the challenge message to produce a response message. A response message comprises at least:

The notification token;

The result of the decryption by the calculator of the encrypted random variable.

The decryption takes place by activation of the private key registered in the memory zone 120.1 for registering a private key of a dual key. According to embodiments of the invention, access to this private key is:

Subjected to the collection of an agreement of the bearer of the calculator: the bearer must press on a button, the pressing of which materializes his agreement. Such a button is presented jointly with a refuse button;

Subjected to the unlocking of the calculator, the unlocking taking place by a conventional method such as PIN code, facial recognition, retinal recognition, fingerprint, etc.

Subjected to a specific unlocking of the key by one of the methods cited previously.

In a step 2150 of sending the response message, the calculator sends the response message produced directly to the proxy authentication server.

In a step 2160 of receipt of a response message, the proxy authentication server receives the response message produced. In a step 2170 of association, following the step 2160 of receipt, the proxy authentication server uses the content of the message, in particular the notification token, to associate the result of the decryption with the challenge token. Thus, it could respond to periodic entreaties of the authentication server.

In a step 2200 of comparison, implementation by the authentication server following a response received at one of its periodic interrogations, the authentication server compares the result of the decryption present in the response received with the random variable that it has produced at the initiation of the authentication process. If the two values are equal then the authentication has succeeded, if not the authentication has failed.

In a preferred alternative of the invention, direct communications between the calculator and the proxy authentication server are encrypted, for example using the SSL protocol.

FIG. 1 shows a secure terminal 600. FIG. 1 shows that the secure terminal 600 comprises:

A microprocessor 610;
Storage means 620;
A communication interface 630;

The microprocessor 610 of the secure terminal 600, the storage means 620 of the secure terminal 600 and the communication interface 630 of the secure terminal 600 are interconnected by a bus 650.

FIG. 1 shows that the secure terminal is connected to the second private network.

The secure terminal is thus connected to the same network as the authentication server. In an alternative of the invention, the calculator may act as secure terminal if it is connected to the second private network, for example via a Wi-Fi terminal of this network. In another alternative, the secure terminal is a desktop or portable computer connected to the second private network.

Figure 3:
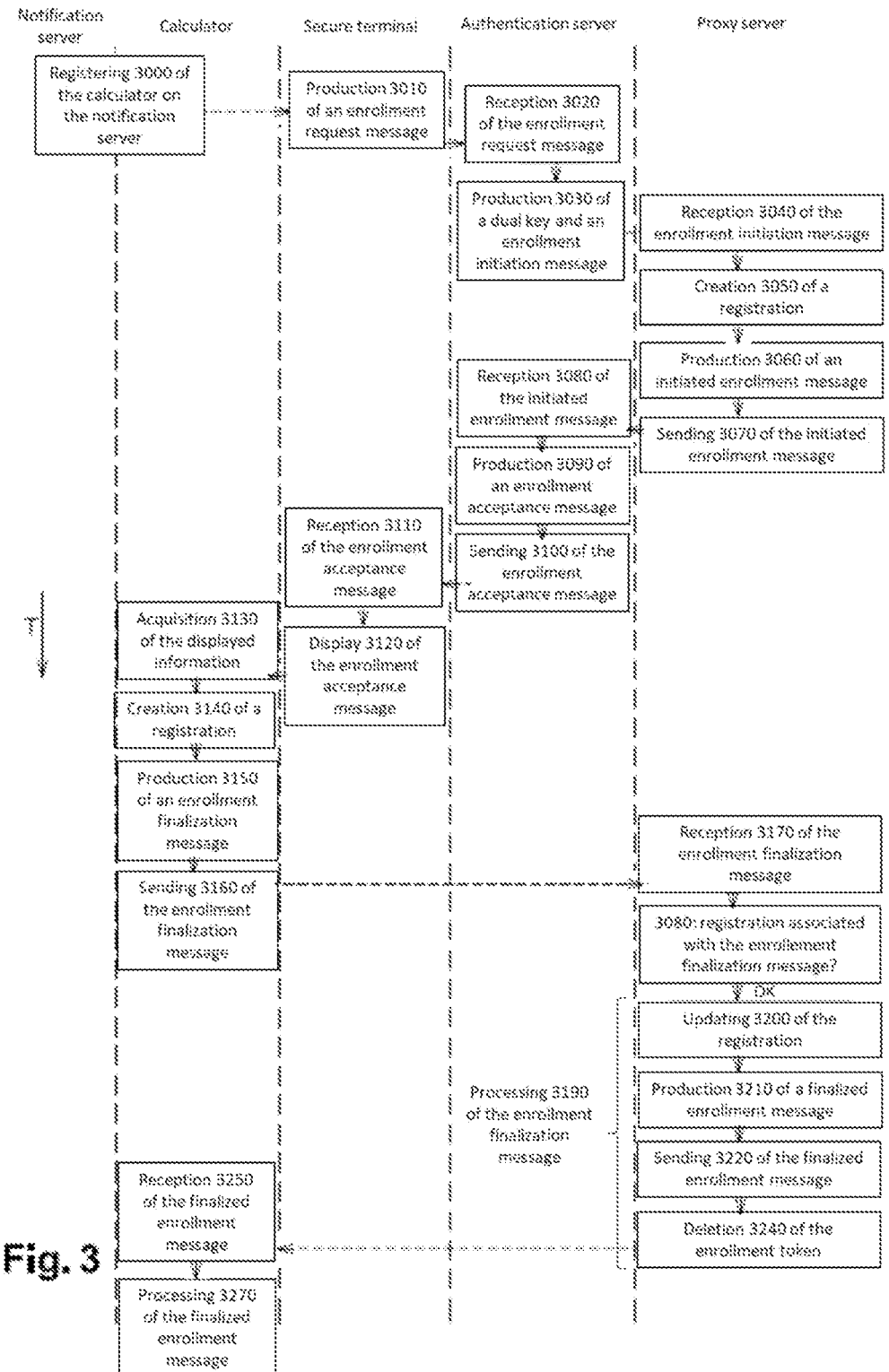
FIG. 3, an essentially chronological illustration of steps of an enrollment method for the implementation of an authentication according to the invention, the steps being represented distributed by actor;
For the designation of the actors, the following convention is used:
C: calculator;
N: notification server;
TS: secure terminal;
A: authentication server;
MA: proxy authentication server.

FIG. 3 shows a step 3000 of registering the calculator on the notification server. During this registration, the calculator obtains the identifier of the user on the notification server. It is thus in this step that the calculator updates the memory zone 120.2 for registering a user identifier on the notification server 200. For the user, this comes down to creating an account on the notification server in order to be able to use the notification service.

FIG. 3 shows a step 3010 wherein the secure terminal is used to produce an enrollment request message. This message may be produced providing that the user is authenticated on the authentication server. This authentication takes place at the moment of an opening of session on the secure terminal, or at the moment of connection to a Wi-Fi network. Once the enrollment request message has been produced it is sent to the authentication server via the second private network.

FIG. 3 shows a step 3020 wherein the authentication server receives an enrollment request message. This message allows it to identify a user in its user database. Indeed, in order that such a message can be sent, it is necessary that its sender is authenticated beforehand. The data of the message making it possible to identify the sender thus also make it possible to find a user in the user database.

The authentication server then passes to a step 3030 wherein it carries out the following actions:

Production of a dual key that it associates with the user identified by the enrollment request message;
Production of an enrollment initiation message that it sends to the proxy authentication server.

FIG. 3 shows a step 3040 of receipt of an enrollment initiation message wherein the proxy authentication server receives the enrollment request message sent by the authentication server. Upon receipt of the enrollment initiation message, the proxy authentication server carries out the actions corresponding to the following steps:

A step 3050 of creation of a registration in its user database. This production includes the creation of a user identifier on the proxy authentication server. The proxy authentication server associates an enrollment token with this new registration.

A step 3060 of production of an initiated enrollment message, this message comprising:
The user identifier on the proxy authentication server of the registration created;
The enrollment token associated with the registration created.

A step 3070 of sending an initiated enrollment message wherein the proxy authentication server sends the initiated enrollment message in response to the enrollment initiation message.

FIG. 1 shows a step 3080 of receipt of an initiated enrollment message wherein the authentication server receives the initiated enrollment message sent.

From step 3080 of receipt of an initiated enrollment message, the proxy authentication server passes to a step 3090 of production of an enrollment acceptance message comprising:

At least the private key of the dual key produced previously;
The enrollment token contained in the initiated enrollment message.

Once the enrollment acceptance message has been produced, the proxy server passes to a step 3100 of sending an enrollment acceptance message wherein it sends the enrollment acceptance message to the secure terminal. This enrollment acceptance message is a response to the enrollment request message sent by the secure terminal.

FIG. 3 shows a step 3110 of receipt of an enrollment acceptance message by the secure terminal. In this step, the secure terminal receives the enrollment acceptance message sent by the proxy server. The secure terminal then passes to a step 3120 of displaying on a screen of the secure terminal information contained in the enrollment acceptance message. This information is displayed, for example, in the form of a QR Code. In another alternative, the information is displayed in text mode.

FIG. 3 shows a step 3130 of acquisition by the calculator of the information displayed on the screen of the secure terminal. The acquisition implemented depends on the display mode used.

Once the data has been acquired, the calculator implements the following steps:

A step 3140 of creation of a registration associating the private key of the dual key acquired, that is to say updating the memory zone (120.1) for storing the private key of the dual key of the calculator.

A step 3150 of production of an enrollment finalization message comprising at least:
The acquired enrollment token The identifier of the user on the notification server, that is to say the content of the memory zone 120.2 for storing an identifier of the user on a notification server of the calculator.

A step 3160 of sending an enrollment finalization message wherein the calculator sends the enrollment finalization message to the proxy authentication server.

FIG. 3 shows a step 3170 of receipt by the proxy authentication server of an enrollment finalization message wherein the proxy authentication server receives the enrollment finalization message sent by the calculator. Following this receipt, the proxy authentication server searches for, in a step 3180, in its user database, a registration associated with the enrollment token contained in the enrollment finalization message received. If such a registration is found, then the proxy authentication server passes to a step 3190 of processing the enrollment finalization message received by implementing the following steps:

A step 3200 of updating the registration found with the user identifier on the notification server contained in the enrollment finalization message received;

A step 3210 of production of a finalized enrollment message comprising:
   The user identifier on the proxy authentication server of the registration found;

A step 3220 of sending a finalized enrollment message wherein it sends the finalized enrollment message in response to the message of finalization of registration, that is to say to the calculator;

A step 3230 of sending an enrollment confirmation message to the authentication server;

A step 3240 of deletion of the enrollment token wherein it deletes the enrollment token in such a way that it cannot be re-used.

In practice, a token is a single-use identifier having a time-limited lifespan.

FIG. 3 shows a step 3250 of receipt, by the calculator, of a finalized enrollment message wherein the calculator receives the finalized enrollment message sent. The calculator then passes to a step 3270 of processing a finalized enrollment message wherein it processes the finalized enrollment message received by carrying out the following action:

Association with the registration corresponding to the enrollment finalization message of the user identifier on the proxy authentication server contained in the finalized enrollment message. This comes down to updating the memory zone (120.3) for storing an identifier of the user on the proxy authentication server of the calculator. It is noted that the updated registration also corresponds to the finalized enrollment message received because the message received is a response to the enrollment finalization message.

At this moment, the enrollment is terminated and the calculator may be used as authentication means.

With the invention, users have at their disposal a strong authentication means based on the possession of a calculator, for example a mobile telephone, and only requiring little interaction.

Among the technical advantages and problems resolved may be cited:

The user uses his mobile and the application to enroll in several information systems, or several independent authentication servers. Potentially using a plurality of identities.

At the moment where the user authenticates himself, a simple notification requests a confirmation, and makes it possible to finalize the authentication.

It is a multi-factor authentication means of the type "what I have"; the enrolled telephone, and "what I know"; the means for unlocking usage of the keys; PIN code, prints, etc.

The information system of the company controls who can be authenticated and can revoke the authentication means of the user at any moment.

The authentication server of the company is not necessarily visible from outside the company.

The authentication server of the company does not have a restrictive technical link with the notification infrastructures of the telephone providers, nor with the mobile application.

The users are completely managed by the authentication servers of the company, the proxy server does not know the users.

The system is pooled for several clients and the authentication data are perfectly partitioned. The keys used are secure in the telephone and in the authentication servers of the company.

The mobile application and the proxy server may have life cycles completely independent of the authentication servers internal to the companies. The mobile application and the proxy server evolve technically to adapt to the evolutions of the providers of notification services, without impact on the client authentication servers.

The encryption and token mechanisms ensure that neither the providers of notification services nor the proxy server can intercept data or usurp authentications or identities.

The principle applies equally to the authentication of Web applications or non-Web applications, whether they are visible or not on the Internet. The principle may also apply, for example, to an authentication mechanism on a work station.

What is claimed is:

1. A method for authenticating a user with an authentication server,
   wherein the authentication server comprises
   a first memory zone for storing a registration of said user in said authentication server, said registration comprising an association of a plurality of fields, said registration associating
      a first user identifier on the authentication server via a user identifier field on the authentication server of said plurality of fields,
      a second user identifier on a proxy authentication server via a user identifier field on the proxy authentication server of said plurality of fields;
      a public key of a dual key via a certificate field of said plurality of fields;
   wherein the method allows an authentication of the user using a calculator associated with said user comprising
      a storage zone, said storage zone of said calculator comprising
      a second memory zone for storing a private key of the dual key;
      a third memory zone for storing the second user identifier on a notification server;
      a fourth memory zone for storing the second user identifier on the proxy authentication server;
   wherein the authentication takes place through the proxy authentication server comprising the first memory zone for storing the registration associating the second user identifier on the proxy authentication server;
the second user identifier on the notification server;
the method comprising:
receiving, by the authentication server, an authentication request message from the user,
  wherein said authentication request message comprises an identification datum of the user to authenticate,
    wherein the identification datum of the user enables the authentication server to find the registration that corresponds to the user to authenticate,
    wherein said identification datum comprises said first user identifier on said authentication server, or
    datum associated with said first user identifier on the authentication server;
once said registration is found, producing, by the authentication server,
  a random variable and
  a challenging message,
    wherein said random variable is encrypted, via said authentication server, with the public key, to produce an encrypted random variable,
    wherein said challenging message comprises contents comprising
      said encrypted random variable,
      the second user identifier on the proxy authentication, server;
sending the challenging message, by the authentication server, to the proxy authentication server;
receiving, by the proxy authentication server, the challenging message;
using the contents of the challenging message, said proxy authentication server finds the registration,
  wherein said registration that is found is a proxy user registration;
producing, by the proxy authentication server upon receipt of the challenging message
  a challenge token associated with the challenging message;
  a notification message comprising
    the second user identifier on the notification server;
    a notification token, produced by the proxy authentication server, the notification token being associated, on the proxy authentication server, with the challenging message;
transmitting, by the proxy authentication server, the challenge token to the authentication server in response to the challenging message;
receiving, by the authentication server, the challenge token;
sending the notification message, by the proxy authentication server, to the notification server;
via the notification server, accepting the notification message and delivering the notification message to the calculator;
producing by the calculator, upon receipt of the notification message, a challenge accepted message,
  the challenge accepted message comprising
    the second user identifier on the proxy authentication server, read in said storage zone of said calculator;
    the second user identifier on the notification server;
    the notification token read in the notification message that is received;
sending, by the calculator, the challenge accepted message directly to the proxy authentication server;
producing by the proxy authentication server, upon receipt of the challenge accepted message, a challenge message comprising
  the notification token,
  the encrypted random variable comprised in the challenge accepted message;
sending, by the proxy authentication server, the challenge message directly to the calculator;
decrypting by the calculator, the encrypted random variable using the private key and producing by the calculator, upon receipt of the challenge message, of a response message comprising
  the notification token,
  a result of the decrypting of the encrypted random variable;
sending, by the calculator, the response message directly to the proxy authentication server;
associating by the proxy authentication server, upon receipt of the response message, the result of the decrypting and the challenge token using the notification token;
interrogating by the authentication server the proxy authentication server to obtain the result of the decrypting associated with the challenge token;
comparing by the authentication server the result of the decrypting with the random variable to determine a result of the authentication,
  such that if the result of the decrypting and the random variable are equal, then the authentication is successful, and
  such that if the result of the decrypting and the random variable are not equal, the authentication is unsuccessful.

2. The method according to claim 1, wherein the dual key, the second user identifier on the proxy authentication server, and the second user identifier on the notification server are produced during an enrollment of the calculator, wherein the user uses the calculator and a secure terminal connected to the authentication server, and wherein said enrollment comprises the user registering himself, with the calculator, on the notification server and obtains the second user identifier on the notification server;
  the user using the secure terminal to authenticate himself on the authentication server and to send an enrollment request message to the authentication server;
  producing, by the authentication server upon receipt of the enrollment request message, the dual key associated with the user;
  an enrollment initiation message sent to the proxy authentication server;
  implementing, by the proxy authentication server upon receipt of the enrollment initiation message, creation of the registration associating
    the second user identifier on the proxy authentication server;
    an enrollment token;
  producing of an initiated enrollment message comprising
    the second user identifier on the proxy authentication server;
    the enrollment token;
  sending the initiated enrollment message in response to the enrollment initiation message to the authentication server;
  implementing, by the authentication server upon receipt of the initiated enrollment message,
    production of an enrollment acceptance message comprising at least the private key of the dual key;
the enrollment token;
sending the enrollment acceptance message in response to the enrollment request message to the secure terminal;
implementing, by the secure terminal upon receipt of the enrollment acceptance message, displaying, on a screen of the secure terminal, content of the enrollment acceptance message;
acquiring, by the calculator, data displayed on the screen of the secure terminal;
implementing, by the calculator further to the acquiring of the data,
creation of the registration associating
the private key of the dual key;
the second user identifier on the notification server;
producing an enrollment finalization message comprising
the enrollment token;
the second user identifier on the notification server;
sending the enrollment finalization message to the proxy authentication server;
implementing, by the proxy authentication server following the receipt of the enrollment finalization message, when the registration corresponds to the enrollment token of the enrollment finalization message then
associating the second user identifier on the notification server with the registration that corresponds to the enrollment token of the enrollment finalization message;
producing a finalized enrollment message comprising
the second user identifier on the proxy authentication server of the registration that corresponds to the enrollment token of the enrollment finalization message;
sending the finalized enrollment message in response to the enrollment finalization message to the calculator;
sending an enrollment confirmation message to the authentication server;
deleting the enrollment token;
implementing, by the calculator upon receipt of the finalized enrollment message,
association with the registration corresponding to the enrollment finalization message of the second user identifier on the proxy authentication server.

3. The method according to claim 1, wherein access to the second memory zone, the third memory zone and the fourth memory zone of the calculator is locked by a security mechanism local to the calculator.

\* \* \* \* \*